United States Patent [19]

Hefner, Jr. et al.

[11] Patent Number: 5,241,021

[45] Date of Patent: Aug. 31, 1993

[54] ACTIVE HYDROGEN-CONTAINING COMPOSITIONS, PROCESS FOR PREPARING RIGID POLYURETHANE FOAMS AND ARTICLES PREPARED THEREFROM

[75] Inventors: Robert E. Hefner, Jr., Lake Jackson, Tex.; Deborah I. Haynes, Carmel, Ind.

[73] Assignee: The Dow Chemical Company, Midland, Mich.

[21] Appl. No.: 788,690

[22] Filed: Nov. 6, 1991

[51] Int. Cl.⁵ ............................................ C08F 283/00
[52] U.S. Cl. .................................... 525/528; 525/510; 525/511; 525/532; 525/533
[58] Field of Search ............... 525/510, 511, 528, 532, 525/533

[56] References Cited

U.S. PATENT DOCUMENTS

| | | |
|---|---|---|
| 3,238,273 | 3/1966 | Hampson et al. |
| 3,781,235 | 12/1973 | Trott et al. |
| 4,119,609 | 10/1978 | Allen et al. ........................ 525/510 |
| 4,309,532 | 1/1982 | Cuscurida et al. |
| 4,316,991 | 2/1982 | Speranza et al. |
| 4,323,658 | 4/1982 | Speranza et al. |
| 4,373,034 | 2/1983 | Speranza et al. |
| 4,374,965 | 2/1983 | Dickie et al. ........................ 525/510 |
| 4,394,463 | 7/1983 | Cuscurida et al. |
| 4,495,341 | 1/1985 | Stamberger. |
| 4,518,720 | 5/1985 | Cuscurida et al. |
| 4,518,778 | 5/1985 | Cuscurida. |
| 4,521,572 | 6/1985 | Cuscurida et al. |
| 4,535,133 | 8/1985 | Cuscurida et al. |
| 4,539,378 | 9/1985 | Cuscurida et al. |
| 4,566,963 | 11/1986 | Ott et al. ........................ 525/510 |
| 4,585,831 | 4/1986 | Stamberger. |
| 4,609,685 | 9/1986 | Cuscurida et al. |
| 4,647,624 | 3/1987 | Stamberger. |
| 4,696,771 | 9/1987 | Floyd. |

Primary Examiner—Melvyn I. Marquis
Assistant Examiner—Randy Gulakowski

[57] ABSTRACT

The present invention refers to active hydrogen-containing compositions comprising alkoxylated epoxy resin adducts useful in the preparation of rigid polyurethane foams. The active hydrogen-containing compositions comprising alkoxylated epoxy resin adducts of the present invention provide improved physical properties, such as, for example, friability. This invention also refers to prepolymers and foamed articles prepared therefrom.

9 Claims, No Drawings

ACTIVE HYDROGEN-CONTAINING COMPOSITIONS, PROCESS FOR PREPARING RIGID POLYURETHANE FOAMS AND ARTICLES PREPARED THEREFROM

BACKGROUND OF THE INVENTION

The present invention relates to active hydrogen-containing compositions and to articles prepared therefrom. More particularly, the present invention relates to active hydrogen-containing compositions comprising an alkoxylated epoxy resin adduct and its use in the preparation of rigid polyurethane foams.

Polyurethanes are a highly versatile class of plastics which find use in a broad range of applications. The properties of various polyurethanes in many cases determine, and often limit, these applications. Thus, much research is directed toward improving the properties of different types of polyurethanes in order to better meet the needs of a specific end use. In particular, in the field of rigid polyurethane foams, improvements in physical properties, such as, for example, friability, K-factor, compressive strength and dimensional stability are highly sought.

Among numerous approaches to improve the physical properties of rigid polyurethanes, one has been the inclusion of epoxy resins in the reaction mixtures or modification of the polyol used to prepare the polyurethane foam. U.S. Pat. No. 4,309,532 to Cuscurida et al. is directed to modified aminopolyols which are prepared by the reaction of rigid foam polyol initiator having an active hydrogen functionality equal or greater than four, with one or more alkylene oxides, and amine and an epoxy resin. These modified aminopolyols may then be reacted with organic polyisocyanates to prepare rigid polyurethane foams according to the disclosure in U.S. Pat. No. 4,394,463 also to Cuscurida et al.

Further, Floyd in U.S. Pat. No. 4,696,771, discloses aminopolyols which are products of the reaction of N-substituted ethanolamine with a terminal epoxy-containing compound. These aminopolyols are particularly useful in reaction injection molding (RIM) applications.

Another approach includes the use of epoxy resin adducts and is disclosed by Hampson et al. in U.S. Pat. No. 3,238,273. That patent discloses polyurethanes containing a reaction product of an organic polyisocyanate and/or polyisothiocyanate with a polyoxyalkylene polyol or a polyester having terminal hydroxyl groups in the presence of an adduct of a glyoidyl ether and a primary or secondary amine.

Trott et al. in U.S. Pat. No. 3,781,235 discloses a foamable composition convertible into a rigid foam which consists essentially of an isocyanate terminated polyol-prepolymer, an epoxy resin, an inert blowing agent and a dicarbonyl stabilizer selected from, for example, aliphatic dicarboxylic acids and aliphatic dicarboxylic acid anhydrides.

Although the polyurethanes discussed above show improved mechanical and physical properties relative to polyurethanes prepared in the absence of above-mentioned aminopolyols and/or adducts, there is still a need for rigid polyurethane foams exhibiting substantially reduced friability, improved K-factor, and increased compression strength.

Thus, it would be most desirable in the art to prepare polyurethane compositions and foams from compositions which are easily processed and which exhibit enhanced physical properties, such as reduced friability while maintaining comparable K-factor and increased compressive strength from such formulations compared to prior art foams.

SUMMARY OF THE INVENTION

Accordingly, in one aspect, the present invention relates to an active hydrogen-containing composition comprising (a) one or more alkoxylated epoxy resin adducts, and (b) one or more first active hydrogen-containing compounds, wherein the weight proportion between reactants (a) and (b) is from about 0.1:99.9 to about 99.9:0.1.

In another aspect, the present invention is a prepolymer or quasi-polymer prepared by contacting together the above-mentioned active hydrogen-containing composition and an excess of organic polyisocyanate.

Yet in another aspect, the present invention relates to rigid foams and articles prepared from the above-mentioned active hydrogen-containing compositions.

The active hydrogen-containing composition containing alkoxylated epoxy resin adducts of the present invention provides rigid polyurethane foams with improvements in many physical and mechanical properties, including, for example, friability and K-factor, relative to rigid polyurethane foams containing no alkoxylated epoxy resin adducts.

The term "first active hydrogen-containing compound", as used herein, is meant to include any material containing an average of two or more hydrogens reactive with an isocyanate group per molecule.

The term "second active hydrogen-containing compound", as used herein, is meant to include any material containing an average of one or more hydrogens reactive with an epoxide group per molecule.

The term "polyisocyanate", as used herein, is meant to include any material containing an average of two or more isocyanate groups per molecule.

DETAILED DESCRIPTION OF THE INVENTION

In one aspect, this invention relates to an active hydrogen-containing composition comprising (a) one or more alkoxylated epoxy resin adducts, and (b) one or more first active hydrogen-containing compounds, wherein the weight proportion between reactants (a) and (b) is from about 0.1:99.9 to about 99.9:0.1.

The epoxy resin adducts useful in the present invention are prepared by reacting (A) one or more second active hydrogen-containing compounds selected from the group consisting of (1) mono- and polyphenols, (2) mono- and polyamines, (3) mono- and polycarboxylic acids, (4) mono- and polymercaptans, (5) aminophenols, (6) aminocarboxylic acids, (7) phenolic hydroxyl-containing carboxylic acids, and (8) mixtures thereof; with (B) one or more epoxy resins in an amount sufficient to provide 1 to 100, preferably 1 to 20, most preferably 1 to 10 equivalents of hydrogen reactive with an epoxide group (excluding all hydroxyl groups formed by epoxide ring reaction to form the adduct) per equivalent of epoxide reacted.

Representative of the mono- and polyphenol compounds which are useful for preparing the epoxy resin adducts include, for example, phenol, o-, m- ,p-alkylphenols, o-, m-, p-alkoxyphenols, resorcinol, hydroquinone, bisphenol A, 4,4'-dihydroxydiphenylmethane, 3,3',5,5'-tetrabromobisphenol A, 4,4'-thiodiphenol, 4,4'- sulfonyldiphenol, 4,4'-dihydroxydiphenyl oxide, 4,4'-bis(4-(4-hydroxyphenoxy)phenylsulfone)-diphenyl ether, 1,1-bis(4-hydroxyphenyl)cyclohexane, tris(hydroxy-phenyl)methane, phenol or substituted phenol-aldehyde condensation products (novolacs), dicyclopentadiene or an oligomer thereof and phenol or substituted phenol condensation products, mixtures thereof and the like.

Representative of the mono- and polyamine compounds which are useful for preparing the epoxy resin adducts include, for example, aniline, N-methylaniline, 4-methoxyaniline, 4-chloroaniline, 4-methylaniline, 4-cyano-aniline, 2,6-dimethylaniline, 4-aminodiphenyl oxide, 4-aminodiphenylmethane, 4-aminodiphenylsulfone, 4-aminodi-phenylsulfide, methylamine, 4-aminobenzophenone, n-hexylamine. cyclohexylamine, aminonorbornane, 1,2-diaminobenzene, 1.3-diaminobenzene. 1,4-diaminobenzene, 4.4'-diaminodiphenylmethane. 3,3',5,5'-tetrabromo-4,4'-isopropylidenediamine, 4,4'-diaminodiphenyl oxide, 4,4'-diaminodiphenyl sulfone, 4,4'-diaminodiphenyl sulfide, aniline-aldehyde condensation products, tris(aminophenyl)methane, 1,4-cyclohexanediamine, 1,6-hexanediamine, piperazine, ethylenediamine, diethylenetriamine, triethylenetetraamine, aminoethylpiperazine, bis(aminopropyl)ether, bis(aminopropylsulfide), bis-(aminomethyl)norbornane, 2,2'-bis(4-aminocyclohexyl)-propane, 1,1-bis(4-aminophenyl)cyclohexane, 4,4'-bis (4-(4-aminophenoxy)-phenylsulfone)diphenyl ether, aminoethylpiperazine mixtures thereof and the like. Ammonia represents a special case of the primary monoamines useful herein and may be conveniently used as the aqueous ammonium hydroxide solution.

Representative of the mono- and polycarboxylic acid compounds which are useful for preparing the epoxy resin adducts include, for example, benzoic acid, 4,4'-dicarboxydiphenyl methane, 4,4'-isopropylidenediphenylcarboxylic acid, 3,3',5,5'-tetrabromo-4,4'-isopropylidenediphenylcarboxylic acid, terephthalic acid, isophthalic acid, 1,4-cyclo-hexanedicarboxylic acid, 1,6-hexane-dicarboxylic acid, dicyclopentadiene dicarboxylic acid, tris(carboxyphenyl)methane, 4,4'-bis(4-(4-carboxyphenoxy)phenylsulfone)diphenyl ether, 1,1-bis(4-carboxyphenyl)cyclohexane, mixtures thereof and the like.

Representative of the mono- and polymercaptan compounds which are useful for preparing the epoxy resin adducts include, for example, benzenethiol, 1,4-benzenedithiol, 1,3-benzenedithiol, 4,4'-isopropylidenedithiol, 1,4-cyclo-hexanedithiol, 1,6-hexanedithiol, 2,2'-dimercapto-diethylether, 1,2-dimercaptopropane, 1,3-dimercapto-propanol-2, bis(2-mercaptoethylsulfide), tris(mercapto-phenyl)methane, 4,4'-bis(4-(4-mercaptophenoxy)phenyl-sulfone)diphenyl ether, 1,1-bis(4-mercaptophenyl)cyclo-hexane, mixtures thereof and the like.

Representative of the aminophenol compounds which are useful for preparing the epoxy resin adducts include, for example, o-aminophenol, m-aminophenol, p-aminophenol, 2-methoxy-4-hydroxy-1-aminobenzene, 3,5-dimethyl-4-hydroxy-1-aminobenzene. 3-cyclohexyl-4-hydroxy-1-aminobenzene, 2,6-dibromo-4-hydroxy-1-aminobenzene, 5-butyl-5-hydroxyaminobenzene, 3-phenyl-4-hydroxy-1-aminobenzene, 4-(1-(3-aminophenyl)-1-methylethyl)phenol, 4-(1-(4-aminophenyl)ethyl)-phenol, 4-(4-aminophenoxy)phenol, 4-((4-aminophenyl)thio)phenol, (4-aminophenyl)(4-hydroxyphenyl)methanone, 4-((4-aminophenyl)sulfonyl)phenol, 4-(1-(4-amino-3,5-dibromophenyl)-1-methylethyl) -2,6-dibromophenol, N-methyl-p-aminophenol, mixtures thereof and the like.

Representative of the aminocarboxylic acid compounds which are useful for preparing the epoxy resin adducts include, for example, 2-aminobenzoic acid, 3-aminobenzoio acid, 4-aminobenzoic acid, N-methyl-4-aminobenzoic acid, 2-methoxy-4-aminobenzoic acid, 3,5-dimethyl-4-aminobenzoic acid, 3-cyclohexyl-4-aminobenzoic acid, 2,6-dibromo-4-amino-benzoic acid, 5-butyl-4-aminobenzoic acid, 3-phenyl-4-aminobenzoic acid, 4-(1-(3-aminophenyl) -1-methylethyl)-benzoic acid, 4-(1-(4-aminophenyl)ethyl)benzoic acid, 4-(4-aminophenoxy)benzoic acid, 4-((4-aminophenyl)thio) benzoic acid, (4-aminophenyl)(4-carboxyphenyl)methanone, 4-((4-aminophenyl)sulfonyl)benzoic acid, 4-(1-(4-amino-3,5-dibromophenyl)-1-methylethyl) -2,6-dibromobenzoic acid, glycine, N-methylglycine, 4-aminocyclohexanecarboxylic acid, 4-aminohexanoio acid, 4-piperidinecarboxylic acid, mixtures thereof and the like.

Representative of the phenolic hydroxyl containing carboxylic acid compounds which are useful for preparing the epoxy resin adducts include, for example, 2-hydroxybenzoic acid, 3-hydroxybenzoic acid, 4-hydroxybenzoic acid, 2-methoxy-4-hydroxybenzoic acid, 3,5-dimethyl-4-hydroxybenzoic acid, 3-cyclohexyl-4-hydroxybenzoic acid, 2,6-dibromo-4-hydroxybenzoic acid, 5-butyl-4-hydroxybenzoic acid, 3-phenyl-4-hydroxybenzoic acid, 4-(1-(3-hydroxyphenyl)-1-methylethyl)benzoic acid, 4-(1-(4-hydroxyphenyl)ethyl)benzoic acid, 4-(4-hydroxyphenoxy)benzoic acid, 4-((4-hydroxyphenyl)thio)benzoic acid, (4-hydroxyphenyl)(4-carboxyphenyl)methanone, 4-((4-hydroxyphenyl)sulfonyl)benzoic acid, 4-(1-(4-hydroxy-3,5-dibromophenyl) -1-methylethyl)-2,6-dibromobenzoic acid, 4-hydroxyphenylacetic acid, 3-hydroxyphenylacetic acid, 2-hydroxyphenylacetic acid, 4-hydroxyphenyl-2-cyclohexanecarboxylic acid, 4-hydroxyphenoxy -2-propanoic acid mixtures thereof and the like.

The term "epoxy resin", as used herein, is meant to include any material containing an average of two or more epoxide groups per molecule. Suitable epoxy resins are disclosed in copending Patent Application Ser. No. 562,289, filed Aug. 3, 1990, incorporated herein by reference.

Particularly suitable epoxy resins which can be employed herein include those compounds having an average of two or more vicinal epoxide groups per molecule, such as, for example, the glycidyl ethers of bisphenols, the glycidyl esters of dicarboxylic acids, or the glycidyl amines of diamines.

Specific examples of epoxy resins which can be employed to prepare the adduct include, for example, the diglycidyl ethers of resorcinol, 4,4'-isopropylidenediphenol (bisphenol A), 4,4'-dihydroxybenzophenone (bisphenol K), 1,1-bis(4-hydroxyphenyl)-1-phenylethane (bisphenol AP), dihydroxydiphenylmethane (bisphenol F), 3,3',5,5'-tetrabromobisphenol A, 4,4'-thiodiphenol (bisphenol S), 4,4'-sulfonyldiphenol, 4,4'-dihydroxydiphenyl oxide, 3-phenylbisphenol A, 3,3',5,5'-tetrachlorobisphenol A, 3,3'-dimethoxybisphenol A, dipropylene glycol, poly(propylene glycol)s, thiodiglycol; the triglycidyl ether of tris(hydroxyphenyl)methane: the triglycidyl ether of p-aminophenol: the tetraglycidyl ether of 4,4'-diaminodiphenylmethane: the polyglycidyl ether of a phenol or substituted phenol-aldehyde condensation product (novolac): the polyglycidyl ether of a dicyclopentadiene or an oligomer thereof and phenol or substituted phenol condensation product; the advancement reaction products of the aforesaid polyglycidyl ethers with aromatic polyhydroxyl- or polycarboxylic acid containing compounds including, for example, bisphenol A (4,4'-isopropylidenediphenol), o-, m-, p-dihydroxybenzene, 2,4-dimethylresorcinol, 4-chlororesorcinol, tetramethylhydroquinone, 1,1-bis(4-hydroxyphenyl)ethane, bis(4,4'-dihydroxyphenyl)methane, 4,4'-dihydroxydiphenyl ether, 3,3',5,5'-tetramethyldihydroxydiphenyl ether, 3,3',5,5'-dichlorodihydroxydiphenyl ether, 4,4'-bis(p-hydroxyphenylisopropyl)diphenyl ether, 4,4'-bis(p-hydroxyphenoxy)benzene, 4,4'-bis(p-hydroxyphenoxy)-diphenyl ether, 4,4'-bis (4(4-hydroxyphenoxy)phenyl sulfone)diphenyl ether, 4,4'-dihydroxydiphenyl sulfone, 4,4'-dihydroxydiphenyl sulfide, 4,4'-dihydroxydiphenyl disulfide, 2,2'-dihydroxydiphenyl sulfone, 4,4'-dihydroxydiphenyl methane, 1,1-bis(p-hydroxyphenyl)cyclohexane, 4,4'-dihydroxybenzophenone, phloroglucinol, pyrogallol, 2,2',5,5'-tetrahydroxydiphenyl sulfone, tris(hydroxyphenyl)methane, dicyclopentadiene diphenol, tricyclopentadiene diphenol, terephthalic acid, isophthalic acid, p-hydroxybenzoic acid: mixtures thereof and the like.

The epoxy resins which can be employed herein can be prepared by reacting the corresponding di- or polyhydroxyl-containing compound (or amine-containing or carboxylic acid-containing compound) with an epihalohydrin by any suitable means known to those skilled in the art. Suitable such methods are disclosed by Lee and Neville in *Handbook of Epoxy Resins*, McGraw-Hill, (1967): Japan Kokai Tokkyo Koho JP 62 86,484 (87 96, 484); EP 88-008358/92 and Journal of Applied Polymer Science, Vol. 23, 1355-1372 (1972) all of which are incorporated herein by reference.

In reacting the epoxy resin and the second active hydrogen-containing compound(s) to form the epoxy resin adduct the order of addition is not critical. Thus, the epoxy resin and the second active hydrogen-containing compound(s) can be concurrently mixed together and subjected to the reaction conditions, or one component can be added to the other component in increments up to and including continuous addition. If increments are added, all or a part of an added increment can be allowed to react prior to addition of the next increment.

The epoxy resin adduct may also contain unreacted material containing one or more hydrogens which are reactive with an epoxide group per molecule. Thus, in the case of the reaction between aniline and the diglycidyl ether of 4,4'-isopropylidenediphenol, if stoichiometric excess of aniline is employed and not removed, it becomes a part of the epoxy resin adduct. It is preferred that any significant quantity of unreacted material containing only one hydrogen which is reactive with an epoxide group per molecule be removed from the epoxy resin adduct to prevent subsequent chain terminating reactions in the foams of the instant invention.

The epoxy resin adduct may also contain oligomeric components derived from the reaction of epoxide groups from two separate epoxy resin molecules with two hydrogens in a molecule of a second active hydrogen-containing compound.

The epoxy resin adduct may also contain a portion of branched or crosslinked structure derived from the reaction between an epoxide group and the hydroxyl group of a hydroxylpropyl linkage, or reaction between three separate epoxy resin molecules with three hydrogens in a molecule of a second active hydrogen-containing compound.

Reaction conditions for forming these epoxy resin adducts useful in the present invention vary widely, depending upon the type and amount of reactants employed; the type and amount of catalyst(s) used, if any: the type and amount of solvent(s) used, if any: the mode of addition of the reactants employed; and other variables understood by those skilled in the art. Thus, the reaction may be conducted at atmospheric, superatmospheric or subatmospheric pressures and preferably at temperatures of from about 0° C. to about 260° C., more preferably from about 20° C. to about 200° C.,and most preferably from about 25° C. to about 160° C.

The time required to complete the reaction depends not only upon the aforementioned variables, but also upon the temperature employed. Higher temperatures require shorter periods of time whereas lower temperatures require longer periods of time. Generally, however, times of from about 5 minutes to about 1 week, more preferably from about 30 minutes to about 72 hours, most preferably from about 60 minutes to about 48 hours are preferred. The reaction time and temperature profile employed can greatly influence the distribution of components comprising the epoxy resin adducts, thus, higher reaction temperatures with their inherently shorter reaction times, generally induce the formation of more oligomeric component when a material containing two hydrogens reactive with an epoxide group is used, or, additionally, branched or crosslinked structure when a material containing more than two hydrogens reactive with an epoxide group is used.

A catalyst is optionally employed to prepare the epoxy resin adducts useful in the present invention. Suitable catalysts include the phosphines, quaternary ammonium compounds, phosphonium compounds, tertiary amines, mixtures thereof and the like. The amount of catalyst used, if any, depends upon the particular reactants and catalyst employed: however, it is usually employed in quantities from about 0.01 to about 3, preferably from about 0.01 to about 1.5, most preferably from about 0.03 to about 0.75 percent by weight based upon the weight of the epoxy containing compound.

Particularly suitable catalysts are the quaternary phosphonium and ammonium compounds such as, for example, ethyltriphenylphosphonium bromide, -chloride, -iodide, -phosphate or -acetate: ethyltriphenylphosphonium acetate acetic acid complex; tetrabutylphosphonium bromide, -chloride, -iodide or -acetate; tetrabutylphosphonium acetate acetic acid complex: butyltriphenylphosphonium tetrabromobisphenate: butyltriphenylphosphonium bisphenate: butyltriphenylphosphonium bicarbonate: benzyltrimethylammonium chloride: tetramethylammonium hydroxide; mixtures thereof: and the like.

In reacting the epoxy resin and the active hydrogen-containing compound(s) to form the epoxy resin adduct the order of addition is not critical. Thus, the epoxy resin and the active hydrogen-containing compound(s) can be concurrently mixed together and subjected to the reaction conditions, or one component can be added to the other component in increments up to and including continuous addition. If increments are added, all or a part of an added increment can be allowed to react prior to addition of the next increment.

The reaction to form the epoxy resin adducts may be conducted in the presence of one or more solvents.

Solvents may be beneficially employed, for example, to improve the solubility of one or more reactants in the reactant mixture, to dissolve a solid reactant thus rendering it easier to meter into the reaction, or to dilute the concentration of reacting species as a means to moderate the adduct forming reaction and thus vary the distribution of components comprising the adduct. The inert solvent can be removed at the completion of the reaction using conventional methods such as distillation, evaporation or vacuum stripping.

Suitable solvents include those which are substantially inert to reaction with any of the reactants employed or the epoxy resin adduct product formed therefrom. Among the preferred solvents are the aliphatic ketones, such as methylamyl ketone; the chlorinated hydrocarbons, such as perchloroethylene: the aliphatic and cycloaliphatic ethers, such as 1,4-dioxane: and the aromatic hydrocarbons, such as chlorobenzene, toluene and xylene.

Various post treatments may be applied to the epoxy resin adducts useful in the present invention as a means to vary the distribution of components comprising the adduct, to modify the reactivity of the adduct, to modify the physical state of the adduct, or for other known reasons. As a specific example, in the preparation of the epoxy resin adduct of diethylenetriamine and the diglycidyl ether of 4,4'-isopropylidenediphenol, a large stoichiometric excess of amine hydrogen derived from the diethylenetriamine, with respect to epoxide groups derived from the diglycidyl ether of 4,4'-isopropylidenediphenol may be used to favor an adduct with a low content of oligomeric component, however, the finished reaction product now contains, as a part of the epoxy resin adduct composition, a high concentration of diethylenetriamine as the unreacted material containing two or more hydrogens which are reactive with an epoxide group. In the method of the present invention, post treatment of the epoxy resin adduct via vacuum distillation to strip out the unreacted diethylenetriamine may be employed.

Numerous methods of post treatment to vary the distribution of the components comprising the epoxy resin adducts may be employed, such as, for example, recrystallization, chromatographic separation, zone refining, crystal refining, wiping film distillation, extraction, preferential chemical derivatization of one or more components of said epoxy resin adduct followed its removal, combinations thereof and the like. Another class of post treatments of the epoxy resin adducts involves the addition of one or more components to the epoxy resin to modify one or more properties of said adduct. For example, one or more accelerators or retarding agents may be blended with the finished epoxy resin adduct to modify its subsequent reactivity in the preparation of a foam.

Certain of the second active hydrogen-containing compound(s) containing two or more hydrogens which are reactive with an epoxide group which possess dual functional groups, that is, aminophenols, aminocarboxylic acids and phenolic hydroxyl-containing carboxylic acids represent materials which may be utilized under conditions to provide differential reactivity of said functional groups with the epoxide group. Thus, the epoxy resin adduct can be formed by preferential reaction of one type of functional group with the epoxide group, while leaving substantially unreacted the second type of functional group.

It is critical to the present invention to prepare the alkoxylated epoxy resin adduct sequentially, i.e., first prepare the epoxy resin adduct and then partially or completely alkoxylate the epoxy resin adduct.

Alkoxylation of all or a part of the epoxy resin adduct is a specific embodiment of the present invention capable of providing useful modifications in reactivity, processability, etc. to the blends of the present invention as well as the resultant chemical structure provided to the foam compositions of the present invention. The epoxy resin adducts are submitted to alkoxylation with alkylene oxides.

Reaction conditions for forming these alkoxylated epoxy resin adducts useful in the present invention vary widely, depending upon the type and amount of reactants employed; the type and amount of catalyst(s) used, if any: the mode of addition of the reactants employed: and other variables understood by those skilled in the art. Thus the reaction may be conducted at atmospheric, superatmospheric or subatmospheric pressures and preferably at temperatures of from about 0° C. to about 225° C., more preferably from about 20° C. to about 180° C., and most preferably from about 25° C. to about 140° C. The time required to complete the reaction depends not only upon the aforementioned variables, but also upon the temperature employed. Higher temperatures require shorter periods of time whereas lower temperatures require longer periods of time. Generally, however, times of from about 5 minutes to about 1 week, more preferably from about (30 minutes to about 72 hours, most preferably from about 60 minutes to about 48 hours are preferred.

A catalyst is optionally employed to prepare the alkoxylated epoxy resin adducts useful in the present invention. Suitable catalysts include the basic catalysts such as sodium, potassium and barium hydroxide: alkoxide catalysts such as sodium and potassium t-butoxide: and acidic catalysts such as boron trifluoride, stannic chloride and combinations of ferric chloride with thionyl chloride. The amount of catalysts used, it any, depends upon the participation reactants and catalysts employed: however, it is usually employed in quantities form about 0.001 to about 5, preferably from about 0.01 to about 3, most preferalby from about 0 01 to about 1 percent by weight based upon the weight of the alkylene oxide and epoxy resin adduct used.

In reacting the epoxy resin adduct and the alkylene oxide(s) to form the alkoxylated epoxy resin adduct the order of addition is not critical. Thus, the epoxy resin adduct and the alkylene oxide(s) can be concurrently mixed together and subjected to the reaction conditions, or one component can be added to the other component in increments up to and including continuous addition. If increments are added, all or a part of an added increment can be allowed to react prior to addition of the next increment when a basic catalyst, such as for example, potassium hydroxide is used and results in the insitu formation of alkoxide, it is frequently advantageous to remove the water which simultaneously forms, with said alkoxide prior to addition of alkylene oxide(s), thus preventing side reaction of water with alkylene oxide(s).

The alkoxylation of the epoxy resin adduct may be conducted in the presence of one or more solvents for, reasons previously delineated for the epoxy resin adduct forming reaction. Suitable solvents include those which are substantially inert to reaction with any of the reactants employed or the alkoxylated epoxy resin adduct product formed therefrom. Among the preferred solvents are those previously delineated for the epoxy resin adduct forming reaction. The inert solvent and/or any excess of alkylene oxide reactant can be removed at the completion of the reaction using conventional methods such as distillation, evaporation or vacuum stripping.

The various methods of post-treatment delineated for the epoxy resin adducts can also be applied to the alkoxylated epoxy resin adducts. Additionally, if a catalyst, such as, for example potassium hydroxide is used, it is frequently beneficial to post treat the alkoxylated epoxy resin adduct to remove said catalyst. Thus post treatments such as addition of one or more materials to effect neutralization of the catalyst and/or filtration to remove the catalyst are useful.

Suitable alkylene oxides useful in the present invention include, for example, ethylene oxide, propylene oxide, butylene oxide, styrene oxide, 1,2-hexylene oxide and tetrahydrofuran. Preferred alkylene oxides are ethylene and propylene oxides.

The alkoxylated epoxy resin adduct prepared according to the present invention is then blended into one or more first active hydrogen-containing compounds. The first active hydrogen-containing compounds useful in the present invention include those second active hydrogen-containing compounds which contain an average of two or more hydrogens reactive with an epoxide group per molecule previously described as useful in the preparation of the epoxy resin adduct as well as from the group consisting of polyester, polyether or polyetherester polyols.

In a second aspect, the present invention refers to a prepolymer prepared by contacting together the above-mentioned active hydrogen-containing composition and an excess of an organic polyisocyanate.

The prepolymers of the present invention are the reaction products of a stoichiometric excess of an appropriate organic polyisocyanate such that the resulting prepolymer contains free isocyanate groups. The prepolymers can be prepared using conventional methods for preparing prepolymers, such as, for example, those disclosed in U.S. Pat. No. 4,701,476, incorporated herein by reference.

The organic polyisocyanates useful in the present invention are well-known in the art and contain an average of more than one isocyanate group per molecule. Isocyanate containing materials and their preparation are described in, for example, the *Encyclopedia of Chemical Technology*, third edition pp. 789-818, published by John Wiley and Sons (1981), and by Siefken in *Justus Leibegs Annalen der Chemie*, 562, pp. 75-136, both of which are incorporated herein by reference. Thus, any aliphatic, cycloaliphatic, polycycloaliphatic, aryl substituted aliphatic, aromatic or heterocyclic, polyisocyanates or prepolymers and oligomers thereof can be used herein.

Representative of the polyisocyanates useful to prepare the compositions of the present invention include, for example, the following: 1,6-hexamethylene diisocyanate: 1,4-cyclohexane diisocyanate; 1,3-cyclohexane diisocyanate: 2,4- hexahydrotoluene diisocyanate: 2,6-hexahydrotoluene diisocyanate: perhydro-4,4'-diisocyanatodiphenyl methane: perhydro-2,4'-diisocyanatodiphenyl methane: perhydro -2,2'-4,4'- diphenyldiisocyanate: 2,4-toluene diisocyanate: 2,6-toluene diisocyanate: 4,4'-diisocyanatodiphenylmethane: 2,4'-diisocyanatodiphenyl diisocyanate: 2,2'- diisocyanatodiphenyl methane: 2,4'-diisocyanatodiphenyl methane naphthalene-1,5-diisocyanate:; 4,4'-diisocyanatotrimethyl cyclohexane; polyphenylene polymethylene polyisocyanate: mixtures thereof and the like.

Additional polyisocyanates which are useful to prepare the polyurethane compositions of the present invention include polyisocyanates containing urethane groups such as, for example, the reaction product of toluene diisocyanate and trimethylolpropane described in the *Polyurethane Handbook*, pages 77-79, published by Macmillan Publishing Co., Inc. (1985) or those described in U.S. Pat. No. 3,394,164, both of which are incorporated herein by reference: polyisocyanates containing carbodiimide groups such as are described in U.S. Pat. No. 3,152,162 and by Ozaki in *Chenmical Reviews*, 72, pp. 486-558 (1972), both of which are incorporated herein by reference; polyisocyanates containing allophanate groups such as are described in British Patent No. 994,890, Belgian Patent No. 761,626 and in the aforementioned *Polyurethane Handbook* reference, page 81, all of which are incorporated herein by reference: polyisocyanates containing isocyanurate groups such as are described in U.S. Pat. Nos. 3,001,973 and 3,154,522, German Patents Nos. 1,002,789, 1,027,394 and 1,222,067 and in the aforementioned reference, pages 79-80, all of which are incorporated herein by reference: polyisocyanates containing urea groups such as are described in the aforementioned *Polyurethane Handbook* reference, pages 81-82, which is incorporated herein by reference: polyisocyanates containing biuret groups such as are described in U.S. Pat. Nos. 3,124,605 and 3,201,372, British Patent No. 889,050, and in the aforementioned *Polyurethane Handbook* reference, page 82, all of which are incorporated herein by reference: polyisocyanates containing acylated urea groups such as are described in German Patent No. 1,230,778, which is incorporated herein by reference; polyisocyanates containing ester groups such as are described in U.S. Pat. No. 3,567,763, British Patent Nos 965,474 and 1,072,956 and German Patent No. 1,231,688, all of which are incorporated herein by reference; mixtures thereof and the like.

The commercially available isomeric mixtures of toluene diisocyanates, diisocyanatodiphenyl methanes and polyphenyl polymethylene polyisocyanates, as well as the purified polyisocyanates, notably 4,4'-diisocyanatodiphenyl methane, are preferred for use in preparing the compositions of the present invention. Especially preferred are mixtures of either toluene diisocyanate or diisocyanatodiphenyl methane.

Finally, in a third aspect, the invention relates to rigid polyurethane foams and articles prepared by contacting together an organic polyisocyanate, as described above, with the aforementioned active hydrogen-containing composition, in the presence of a blowing agent and under conditions sufficient to form the polyurethane foam.

In preparing the polyurethane materials of the present invention it is also possible, and preferred, to incorporate one or more materials containing on the average two or more isocyanate-reactive hydrogens per molecule. This is in addition to the alkoxylated epoxy resin adduct which is, by definition, also isocyanate-reactive. Suitable materials can be selected from the well-known classes of hydroxyl-, amine- and sulfhydryl-containing materials, including those previously described herein. Typical examples of these materials are listed in the aforementioned *Polyurethane Handbook*, pages 42–60; in "Polyurethanes: Chemistry and Technology, Part I, Chemistry", *High Polymers*, volume XVI, pages 32–61, published by Interscience Publishers (1965); and in *Flexible Urethane Foams Chemistry and Technology*, pages 27–43, published by Applied Science Publishers (1982), all of which are incorporated herein by reference. These materials include the polyether polyols; amine capped polyether polyols; hydroxyl containing polyesters: aliphatic hydroxyl containing polycarbonates: hydroxyl containing polythioethers: hydroxyl containing polyolefins: hydroxyl containing urethanes and ureas prepared, for example, by the reaction of a diisocyanate and a stoichiometric excess of a diol, or by the reaction of a diisocyanate and a stoichiometric excess of a diamine, respectively: hydroxyl and/or amino containing polyesteramides: amino containing polyamides: alkanolamines: aliphatic, cycloaliphatic, polycycloaliphatic diols and polyols: polyamines, for example, polymethylene polyphenylamines: mercaptoalcohols: mercaptoamines; polymer modified polyols, i.e., containing vinyl polymer or copolymer grafted polyol, vinyl polymer or copolymer and unreacted polyol: polyols containing dispersed polyurea particles, i.e., polyurea dispersion polyols: mixtures thereof; and the like.

Polyether polyols possessing average molecular weights of from about 100 to about 6000 and from about 1.8 to about 8 hydroxyl groups are preferred materials containing on the average two or more isocyanate reactive hydrogens per molecule. Blends of these polyether polyols with aromatic diamines or other known "chain extenders", such as, for example, with 3,3'-dichloro-4,4'-diaminodiphenyl methane or 4,4'-methylenebis(3-chloro-2,6-diethylaniline), are also operable.

In the general process used in the present invention, an alkoxylatedepoxy resin adduct and a polyisocyanate and one or more first active hydrogen-containing compounds are combined in proportions which provide an equivalent ratio of active hydrogens to isocyanate groups of from about 0.05:1.0 to about 1.5:1.0, preferably from about 0.15:1.0 to about 0.90:1.0, to provide the polyurethane compositions (foams) of the present invention. The reaction may be performed in stages or increments or as a one-step process. Suitable reaction conditions, reaction times, reaction temperatures, and optional oatalysts for preparation of the polyurethane compositions (foams) of the present invention are well known to those skilled in the art and are described in the aforementioned *Polyurethanes: Chemistry and Technology* reference, pages 129–260, and in the aforementioned *Encyclopedia of Chemical Technology* reference, Vol. 23, pages 576–608, both of which are incorporated herein by reference.

The blowing agents suitable for use in preparing rigid polyurethane foams include any material which is capable of generating a gas under the conditions of the reaction of a polyisocyanate and a isocyanate-reactive compound. Such materials include air, carbon dioxide, nitrogen, water, formic acid, low-boiling halogenated alkanes, finely divided solids, the so-called "azo" blowing agents such as azobis(formamide) and the like. Preferred are water, the low-boiling halogenated alkanes, or mixtures thereof. Blowing agents are advantageously employed in a quantity sufficient to provide the foam with a bulk density from about 0.5, preferably about 0.9, more preferably about 1 1 to about to about 6 or less, preferably about 4, more preferably about 2 pounds per cubic foot. The halogenated alkanes, including methylene chloride, dichlorodifluoromethane, monochlorodifluoromethane, monochlorotrifluoromethane and the like, generally provide the desired density when employed in amounts from about 5 to about 50 parts per 100 parts relatively high equivalent weight compound. Lesser amounts are useful when employed in conjunction with another blowing agent, such as water.

Rigid polyurethane foam is prepared according to this invention by contacting the various components under conditions such that the components react to form a closed-cell polymer. Generally, the reaction mixture may contain additional components such as catalysts, crosslinkers, surfactants, colorants, cell openers, flame retardants, antioxidants, mold release agents and the like, which may vary according to the desired attributes of the foam. The use of such additional components is well understood in the art.

ILLUSTRATIVE EMBODIMENTS

The following examples are given to illustrate the invention and should not be interpreted as limiting it in any way. Unless stated otherwise, all parts and percentages are given by weight.

EXAMPLE 1

(A) Propoxylation of Diethylenet iamine/Diglycidyl Ether of Bisphenol A Adduct and Preparation of a Blend with a Poly(ethylene glycol)

A portion (2450.0 grams) of a commercial grade diethylenetriamine/diglycidyl ether of bisphenol A adduct (D.E.H. ® 52, Dow Chemical Co.) is charged to a reactor, maintained under a nitrogen blanket and heated to 125° C. The diethylenetriamine/diglycidyl ether of bisphenol A adduct is prepared by controlled addition of a diglycidyl ether of bisphenol A (EEW 188, 7990 pounds (3624 kg)) to diethylenetriamine (9110 pounds (4132 kg)) to provide an adduct with a 45.3 amine hydrogen equivalent weight. Once the 125° C. temperature is achieved, stirring commences and propylene oxide (4190 grams) is metered into the reactor using a propylene oxide ramp rate of 0.5 gram per minute to a maximum feed rate of 10 grams per minute so as to control the reaction temperature at 125° C.. A total propylene oxide feed time of 1001 minutes is required and followed by 720 minutes of post reaction at the 125° C. temperature. After completion of the post reaction, excess propylene oxide is stripped from the reactor and the product recovered as a pale yellow colored tacky solid (at 25° C.) with a hydroxyl content of 18.20 percent. A portion (400.0 grams, 25 percent by weight) of the propoxylated adduct is heated to 90° C. and blended with poly(ethylene glycol) (1200.0 grams, 75 percent by weight) having a nominal hydroxyl equivalent weight of 200. After cooling to room temperature, the homogeneous blend is recovered as a pale yellow colored liquid.

(B) Preparation of Propoxylated Diethylenetriamine/Diglycidyl Ether of Bisphenol A Adduct Blend With a Poly(ethylene glycol)

A portion (400.0 grams, 25 percent by weight) of the propoxylated diethylene triamine/diglycidyl ether of bisphenol A adduct from (1-A) above is blended at 100° C. with a poly(ethylene glycol) (1200.0 grams, 75 percent by weight) having a nominal hydroxyl equivalent weight of 200. The blend is recovered as a homogeneous transparent light yellow colored liquid with a nominal hydroxyl equivalent weight of 173.36.

(C) Preparation of Propoxylated Diethylenetriamine

/Diglycidyl Ether of Bisphenol A Adduct

Blend with a Poly(ethylene glycol) and a

Poly(ethyleneterephthalate diol)

A portion (100.0 grams, 10 percent by weight) of the propoxylated diethylenetriamine/diglycidyl ether of bisphenol A adduct from (1-A) above is blended at 90° C. with poly(ethylene glycol) (90.0 grams, 9 percent by weight) having a nominal hydroxyl equivalent weight of 200 and a commercial grade poly(ethyleneterephthalate diol) (Terate 203, Cape Industries) (810.0 grams, 81 peroent by weight) having a hydroxyl equivalent weight of 162.58. After cooling to room temperature, the homogeneous blend is recovered as a brown colored liquid.

(D) Preparation of Propoxylated Diethylenetriamine

/Diglycidyl Ether of Bisphenol A Adduct

Blend With a Poly(ethylene glycol) and a

Poly(ethyleneterephthalate diol)

A portion (250.0 grams, 25 percent by weight) of the propoxylated diethylenetriamine/diglycidyl ether of bisphenol A adduct from (1-A) above is blended at 90° C. with poly(ethylene glycol) (75.0 grams, 7.5 percent by weight) having a nominal hydroxyl equivalent weight of 200 and a commercial grade poly(ethyleneterephthalate diol) (Terate 203, Cape Industries) (675.0 grams, 67.5 percent weight) having a hydroxyl equivalent weight of 162.58. After cooling to room temperature, the homogeneous blend is recovered as a brown colored liquid.

EXAMPLE 2

Preparation of a 300 Index Polyurethaneisocyanurate

Foam from Propoxylated

Diethylenetriamine/Diglycidyl Ether of

Bisphenol A Adduct and Poly(ethylene glycol)

Blend

A mixture of polymethylene polyphenylisocyanate (PAPI ® 580, The Dow Chemical Company) with an isocyanate equivalent weight of 139.5 (140 parts), polyalkylene oxide dimethylsiloxane copolymer (L-5340, Union Carbide) silicone surfactant (1.0 part), and of trichlorofluoromethane (24 55 parts), is prepared to provide the polyisooyanate formulation.

A polyol formulation comprising 0.33 hydroxyl equivalents from Example 1-B (57.21 parts), polyalkyleneoxide dimethylsiloxane copolymer (L-5420, Union Carbide) silicone surfactant (0.7 part), a diglycidyl ether of bisphenol A (D.E.R. ® 331, The Dow Chemical Company) (4.0 parts), trichlorofluoromethane (6.0 parts), 0.05 part glycinate catalyst (CURITHANE ® 52, The Dow Chemical Company) and dimethylcyclohexylamine (0.15 part) is prepared.

Foam preparation is accomplished via the following method: The polyol formulation and polyisocyanate formulation are each well-mixed and equilibrated to 72° F. +/−1° F. (22° C.). A 14 inch×14 inch ×14 inch (35.6 cm×35.6 cm×35.6 cm) corrugated cardboard box is prepared by taping all seams along the bottom to avoid liquid leakage prior to foaming when the polyol and polyisocyanate formulations are mixed and poured into the box.

A ½ horse-power drill press is set at 1800 rpm. A 4 inch (10.2 cm) impeller is affixed to the drill press for mixing. When both polyol and polyisocyanate formulations are equilibrated at 72° F. (22° C.), the polyol formulation is added to the polyisocyanate formulation, mixing of the system is initiated and continued for 10 seconds. After 10 seconds of mixing, the system is quickly poured into the 14 inch×14 inch×14 inch (35.6 cm×35.6 cm×35.6 cm) box to allow foam growth. The reactivity of the foam is determined by observing cream, initiation, and gel times. The foam product is allowed to sit for 24 hours prior to physioal property testing. Test pieces for the retention of K-factor, density, friability, and compressive strength are cut from the finished foam product. K-factor is determined via standard test method (ASTM C-518). The test samples maintained for 5 and 6 months and evaluated for K-factor were maintained at 23° C. to 25° C. and 50 to 60 percent humidity. Density is determined via standard test method (ASTM C-303). Friability is measured via standard test method (ASTM C-421). Compressive strength is determined using an Instron machine with standard test method (ASTM D-1621). Testing results are reported in Table I.

EXAMPLE 3

Preparation of a 300 Index Polyurethaneisocyanurate

Foam from Propoxylated

Diethylenetriamine/Diglycidyl Ether of

Bisphenol A Adduct, Poly(ethylene glycol) and

Poly(ethyleneterephthalate diol) Blend

A mixture as in Example 2 above, except for 24.53 parts of trichlorofluoromethane is prepared to provide the polyisocyanate formulation.

A polyol formulation is prepared comprising 0.33 hydroxyl equivalents from Example 1-C (53.01 parts), polyalkyleneoxide dimethylsiloxane copolymer (L-5420, Union Carbide) silicone surfactant (0.7 part), a diglycidyl ether of bisphenol A (D.E.R. ® 331, The Dow Chemical Company) (4.0 parts), 0.5 part glycinate catalyst (CURITHANE ® 52, The Dow Chemical Company), trichlorofluoromethane (5.0 parts), diethylene glycol (0 165 part) and dimethylcyclohexylamine (0.25 part). The foam preparation and testing are accomplished via the same method as in Example 2 above. Testing results are reported in Table I.

EXAMPLE 4

Preparation of a 300 Index Polyurethaneisocyanurate

Foam from Propoxylated

Diethylenetriamine/Diglycidyl Ether of

Bisphenol A Adduct, Poly(ethyleneglycol) and

Poly(ethyleneterephthalate diol) Blend

A mixture as in Example 2 above except for 23.93 parts of trichlorofluoromethane is prepared to provide the polyisocyanate formulation.

A polyol formulation is prepared comprising 0.33 hydroxyl equivalents from Example 1-D (49.37 parts), polyalkyleneoxide dimethylsiloxane copolymer (L-5420, Union Carbide) silicone surfactant (0.7 part), a diglycidyl ether of bisphenol A (D.E.R. ® 331, The Dow Chemical Company) (4.0 parts), 0.13 part glycinate catalyst (CURITHANE ® 52, The Dow Chemical Company), trichlorofluoromethane (5.00 parts), diethylene glycol (0.04 part) and dimethylcyclohexylamine (0.2 part). The foam preparation and testing are accomplished via the same method as in Example 2 above. Testing results are reported in Table I.

COMPARATIVE EXPERIMENT A

Synthesis of Diethanolamine/Diglycidyl Ether of

Bisphenol A Adduct

Diethanolamine (525.70 grams, 5.00 amine hydrogen equivalents) is added to a 2 liter glass reactor equipped with a mechanical stirrer, chilled water condenser, nitrogen inlet, thermostatically controlled heating mantle, thermometer, and an inlet tube for the diglycidyl ether of bisphenol A. The diethanolamine is heated to 70° C. under a stream of nitrogen flowing at 1 liter per minute, then stirring commenced. A peristaltic pump is started to add diglycidyl ether of bisphenol A (179.95 epoxide equivalent weight (EEW)) to the reactor at a rate of 1.62 gram per minute. During the course of this addition, the temperature is maintained between 70° C. and 71° C.. After a total of 899.75 grams (5.00 epoxide equivalents) of the diglycidyl ether of bisphenol A is added to the reactor, post reaction is completed for 3 hours at 75° C., 12 hours at 90° C., then 2 hours at 150° C.. The adduct is recovered as a transparent tacky solid (at 25° C.) with a hydroxyl content of 17.2 percent.

(B) Preparation of Diethanolamine/Diglycidyl Ether of Bisphenol A Adduct Blend with a Poly(ethylene glycol)

A portion (400.0 grams, 25 percent weight) of the diethanolamine/diglycidyl ether of bisphenol A adduct from A-A above is blended at 100° C. with a poly(ethylene glycol) (1200.0 grams, 75 percent by weight) having a nominal hydroxyl equivalent weight of 200. The blend is recovered as a homogeneous transparent liquid with a nominal hydroxyl equivalent weight of 174.70.

(C) Preparation of Diethanolamine/Diglycidyl Ether of Bisphenol A Adduct Blend with a Poly(ethylene glycol) and a Poly(ethyleneterephthalate diol)

A portion (400.0 grams, 25 percent by weight) of a diethanolamine/diglycidyl ether of bisphenol A adduct prepared using the method of (A-A) above without the 2 hours of post reaction at 150° C. (hydroxyl content of 17.4 percent) is blended at 90° C. with poly(ethylene glycol) (60.0 grams, 7.5 percent by weight) having a nominal hydroxyl equivalent weight of 200 and a commercial grade poly(ethyleneterephthalate diol) (Terate 203, Cape Industries) (540.0 grams, 67.5 percent by weight) having a hydroxyl equivalent weight of 162.58. After cooling to room temperature, the homogeneous blend is recovered as a brown colored liquid.

COMPARATIVE EXPERIMENT B

Preparation of a 300 Index Polyurethaneisocyanurate

Foam from Diethanolamine/Diglycidyl Ether of

Bisphenol A and

Poly(ethylene glycol) Blend

A mixture of polymethylene polyphenylisocyanate (PAPI ® 580, The Dow Chemical Company) with an isocyanate equivalent weight of 139.5 (140 parts), polyalkyleneoxide dimethylsiloxane copolymer (L-5340, Union Carbide) silicone surfactant (1.0 part), trichlorofluoromethane (25.02 parts) is prepared to provide the polyisocyanate formulation.

A polyol formulation comprising 0.33 hydroxyl equivalents from Comparative Experiment A-B (57.65 parts), polyalkyleneoxide dimethylsiloxane copolymer (L-5420, Union Carbide) silicone surfactant (0.7 part), a diglycidylether of bisphenol A (D.E.R. ® 331, The Dow Chemical Company) (4.0 parts), trichlorofluoromethane (6.0 parts), a glycinate catalyst (CURITHANE ® 52, The Dow Chemical Company) (1.25 parts) and dimethylcyclohexylamine (0.1 part) is prepared. The foam preparation and testing are accomplished via the same method as in Example 2 above. Testing results are reported in Table I.

COMPARATIVE EXPERIMENT C

Preparation of a 300 Index Polyurethaneisocyanurate Foam

A mixture of polymethylene polyphenylisocyanate (PAPI ® 580, The Dow Chemical Company) with an isocyanate equivalent weight of 139.5 (140 parts), polyalkyleneoxide dimethylsiloxane copolymer (L-5340, Union Carbide) silicone surfactant (1.0 part) is prepared to provide the polyisocyanate formulation.

A polyol formulation comprising 0.33 equivalents of a propoxylated polymethylene polyphenyl amine resin polyol (ISONOL ® 152, The Dow Chemical Company) with a hydroxyl equivalent weight of 138.9 (45.0 parts), polyalkyleneoxide dimethylsiloxane copolymer (L-5420, Union Carbide) silicone surfactant (0.7 part), a diglycidylether of bisphenol A (D.E.R. ® 331, The Dow Chemical Company) (6.0 parts), trichlorofluoromethane (33.0 parts), a glycinate catalyst (CURITHANE ® 52, The Dow Chemical Company) (1.9 parts) and dimethylcyclohexylamine (0.8 part) is prepared. The foam preparation and testing are accomplished via the same method as in Example 2 above. Testing results are reported in Table 1.

TABLE I

| PHYSICAL PROPERTY | Example 2 | Example 3 | Example 4 | Comparative Experiment B* | Comparative Experiment C* |
|---|---|---|---|---|---|
| DENSITY, lb/ft$^3$ | 2.33 | 2.09 | 2.24 | 2.14 | 1.91 |
| (kg/m$^3$) | (37.32) | (33.48) | (35.88) | (34.28) | (30.59) |
| K-FACTOR. (Btu · in/h · ft$^2$ · °F.) Initial | 0.153 | 0.136 | 0.137 | 0.165 | 0.142 |
| K-FACTOR. (Btu · in/h · ft$^2$ · °F.) 5 months | ND** | 0.183 | 0.189 | ND** | 0.194 |
| K-FACTOR. (Btu · in/h · ft$^2$ · °F.) | ND** | 0.185 | 0.193 | ND** | 0.198 |

TABLE I-continued

| PHYSICAL PROPERTY | Example 2 | Example 3 | Example 4 | Comparative Experiment B* | Comparative Experiment C* |
|---|---|---|---|---|---|
| 6 months FRIABILITY (%) | 6.03 | 0.96 | 1.81 | 15.79 | 30.0 |
| COMPRESSIVE STRENGTH psi (kPa) | | | | | |
| TO RISE | 34.2 | 46.0 | 46.7 | 33.3 | 34.7 |
| | (235.8) | (317.2) | (322.0) | (229.6) | (239.2) |
| ACROSS | 13.4 | 19.6 | 18.5 | 14.0 | 14.5 |
| | (92.4) | (135.1) | (127.6) | (96.5) | (100.0) |
| DOWN | 14.6 | 18.6 | 19.7 | 15.6 | 18.4 |
| | (100.7) | (128.2) | (135.8) | (107.6) | (126.9) |

*Not an example of the present invention
**ND = Not determined

As apparent from the data shown in Table I above, the foams of the present invention, prepared with the alkoxylated epoxy resin adduct, exhibit substantially improved K-factor retention, reduced friability as well as increased compression strength as compared to foams with no alkoxylated epoxy resin adduct added.

What is claimed is:

1. An active hydrogen-containing composition useful for the preparation of rigid polyurethane foams comprising (a) one or more alkoxylated epoxy resin adducts, and (b) one or more first active hydrogen-containing compounds that contain an average of two or more hydrogens reactive with an isocyanate group per molecule, wherein the weight proporation between reactants (a) and (b) is from about 0.1:99.9 to about 99.9:0.1 and wherein reactant (a) is prepared by reacting (i) one or more second active hydrogen-containing compounds that contain an average of one or more hydrogens reactive with an epoxide group per molecule with (ii) one or more epoxy resins, in an amount sufficient to provide 1 to 100 equivalents of hydrogens reactive with an epoxide group (excluding aliphatic hydroxyl groups formed by epoxide ring opening reacting to form the adduct) per equivalent of epoxide reacted, and then partially or completely alkoxylating reactant (a).

2. An active hydrogen-containing composition of claim 1 wherein said alkoxylated epoxy resin adduct is prepared via alkoxylation with propylene oxide.

3. An active hydrogen-containing composition of claim 1 wherein said first active hydrogen-containing compound is a polymethylene polyphenylamine, a poly(ethyleneterephthalate diol), a poly(ethylene glycol) or a mixture thereof.

4. An active hydrogen-containing composition of claim 1 wherein said epoxy resin adduct contains amine hydrogen groups.

5. An active hydrogen-containing composition of claim 4 wherein said epoxy resin adduct is the reaction of a diglycidyl ether of bisphenol A and diethylenetriamine.

6. A prepolymer or quasi-polymer prepared by contacting together an active hydrogen-containing composition according to claim 1 and an excess of an organic polyisocyanate.

7. A foam article prepared from the active hydrogen-containing composition containing an alkoxylated epoxy resin adduct according to claim 1.

8. An active hydrogen-containing composition of claim 5, wherein the proportion between equivalents of hydrogens reactive with an epoxide group (excluding aliphatic hydroxyl groups formed by epoxide ring opening reacting to form the adduct) per equivalent of epoxide reacted is 1 to 20.

9. A rigid polyurethane foam prepared by contacting together, in the presence of a blowing agent and under conditions sufficient to form the polyurethane foam, an organic polyisocyanate with an active hydrogen-containing composition comprising (a) one or more alkoxylated epoxy resin adducts, and (b) one or more first active hydrogen-containing compounds, wherein the weight proportion between reactants (a) and (b) is from about 0.1:99.9 to about 99.9:0.1.

* * * * *